Aug. 6, 1957  R. N. ANDERSON ET AL  2,802,176
BUSHING FOR ELECTRICAL APPARATUS
Filed Jan. 26, 1954
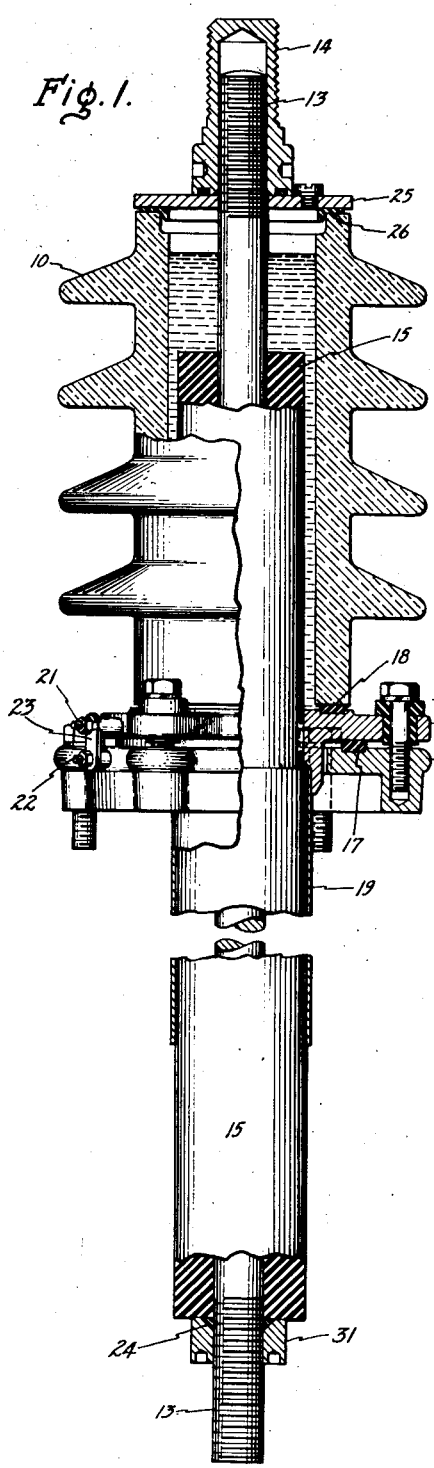
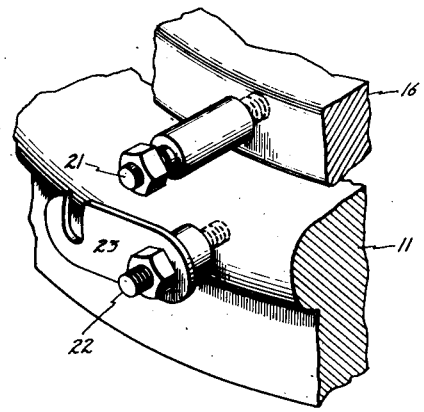
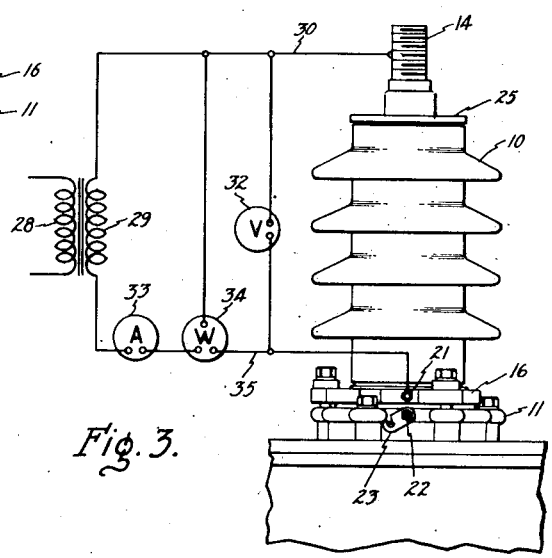
Inventors
Roger N. Anderson,
Donald L. Johnston,
by Gilbert P. Tarleton
Their Attorney.

United States Patent Office 2,802,176
Patented Aug. 6, 1957

2,802,176

BUSHING FOR ELECTRICAL APPARATUS

Roger N. Anderson and Donald L. Johnston, Pittsfield, Mass., assignors to General Electric Company, a corporation of New York Application January 26, 1954, Serial No. 406,122

6 Claims. (Cl. 324—54)

This invention relates to bushings for electrical apparatus an dparticularly to bushings with means incorporated therein for quickly determining the dielectric losses through the entire bushing including the porcelain insulating shell.

Terpak and Wetherill Patent 2,402,466, which was assigned the same assignee as the present application, disclosed and claimed a bushing having a coaxial conducting shield around the high voltage conductor, the shield being grounded during normal use but having a jumper connection whereby ground could be removed from the shield and the shield could be connected to a test apparatus to measure dielectric losses in the insulation between the shield and high voltage conductor. While the bushing of Terpak and Wetherill was very satisfactory for measuring the leakage between the ground shield and high voltage conductor, we have found that the leakage thus measured did not represent the total loss in the bushing since there was an independent leakage path on the exterior of the ground shield and in many cases leakage through the alternate path was of greater effect than leakage between the ground shield and conductor.

It is one object of the present invention to provide a bushing with structure which will enable the entire dielectric losses of the bushing to be measured in a single test operation.

It is another object of the invention to provide a bushing structure in which the insulation quality of the porcelain insulating shell may be quickly and easily determined.

It is a further object of the invention to provide a bushing in which a power factor test of the entire bushing may be made without disconnecting the stud of the bushing from windings of the apparatus with which the bushing is employed.

Further objects of the invention will become apparent from the following description and accompanying drawing in which Fig. 1 is a side view in partial section of a bushing constructed in accordance with this invention; Fig. 2 is an enlargement of a portion of Fig. 1; and Fig. 3 shows a bushing similar to that illustrated in Fig. 1 with a test circuit connected thereto.

Briefly stated, in accordance with one of its aspects, the bushing of this invention comprises a shell of insulating material, a supporting flange axially disposed with respect to the shell, a high voltage conductor extending through the shell, and flange, a conducting ring between adjacent surfaces of the shell and flange, means for insulating the ring from the flange, and removable strap means for electrically connecting the ring to the flange during normal operation of the bushing, and for connecting the ring to a testing apparatus for measuring the quality of the bushing insulation.

In Fig. 1 of the drawing, there is shown a bushing construction which includes a shell 10 of any suitable insulating material, preferably a ceramic such as porcelain, and a supporting flange 11 which is axially disposed with respect to the shell 10, the flange being adapted to be mounted on the casing of the apparatus with which the bushing is employed. A stud 13 composed of a good conductor such as copper extends through the shell and supporting flange, the lower end of the stud being adapted to be connected to windings of an apparatus. A terminal cap 14 is threadably mounted on the upper end of the bushing for making connection between the stud 13 and a suitable electric circuit. Surrounding the portion of the stud 13 except for the ends is a sleeve 15 of suitable insulating material such as a plurality of layers of paper impregnated with shellac or Bakelite.

Between adjacent surfaces of the insulating shell 10 and supporting flange 11 there is positioned a conducting ring 16 which is insulated from the flange 11 as by a gasket 17 of insulating material. The side of the ring 16 away from the flange 11 is spaced from the ceramic shell 10 by means of a gasket 18 similar to the gasket 17. The base of the ring 16 is connected to a metal sleeve 19 which forms a tight fit around the insulation 15 and serves as a support therefor. As best shown in Fig. 2, a terminal 21 on the ring 16 is disposed opposite a terminal 22 on the flange 11 and there is a jumper connection 23 which connects these terminals during normal operation of the apparatus upon which the bushing is mounted.

The terminal cap 14 at the upper end of the conducting stud 13 may be tightened against a plate 25 impinging against a gasket 26 which in turn engages the insulating shell 10.

The bottom end of the conducting stud 13 has sealing nut 31 mounted thereon. The sealing nut 31 seals the lower end of the insulating sleeve 15 to the center conductor by compressiong a gasket 24 which prevents movement of the center conductor in the insulation sleeve 15. The terminal cap 14 is then tightened to position the insulating shell 10 firmly against the ring 16.

During normal operation of the bushing, the jumper 23 is in the position illustrated in Fig. 1. When it is desirable to make a power factor test of the bushing insulation, the jumper 23 is disconnected from the terminal 21 and there is connected in place thereof a test circuit, as shown in Fig. 3, which may include a transformer having a primary winding 28 which is adapted to be connected to a suitable source of potential and a secondary winding 29, one end of which may be connected to the terminal cap 14 through the conductor 30, the opposite end being adapted to be connected to the terminal 21 through the conductor 35. The voltage applied across the insulation and ceramic shell 10 may be measured by any suitable meter indicated by a numeral 32 which is connected across the wires 30 and 35, and the current flowing through the insulation and shell and the watts lost may be measured with the instruments indicated by the numerals 33 and 34, respectively.

When a bushing made in accordance with this invention was equipped with a faulty porcelain shell 10, a test of the bushing showed that it had a power factor of 3.98%. A grounded conductor was then wrapped around the shell 10 and the test was repeated. The power factor was then 1.40%, or less than half the total power factor including leakage losses through the shell 10. The 1.40% power factor represents the losses which would be measured in a bushing of the structure disclosed by Terpak and Wetherill. Since it is the total power factor which is important, it may be seen that a bushing made in accordance with the present invention constitutes a decided forward step in the art. This type of construction is particularly desirable in a bushing wherein protracted field use has resulted in considerable contamination or a crack of the porcelain insulating shell 10.

While the present invention has been described with reference to particular embodiments thereof, it will be understood that numerous modification may be by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. A bushing for electrical apparatus comprising a shell of insulating material, a normally grounded supporting flange axially disposed with respect to said shell, a high voltage conductor extending through said shell and said flange, a conducting ring between adjacent surfaces of said shell and said flange, means for insulating said ring from said flange, conducting shield means radially surrounding said conductor and extending through said flange, said conducting shield means being electrically insulated from said conductor and said flange and electrically connected to said ring, said flange being free of electrical connection to solid insulation of said bushing except by way of said conducting ring, and means including removable strap means for selectively electrically connecting said ring to said flange during normal operation of said bushing and for disconnecting said ring from said flange during a testing operation for measuring the quality of said bushing insulation.

2. A bushing for electrical apparatus comprising an elongated high voltage conductor, a sleeve of insulating material around said conductor except for the ends thereof, a ceramic shell around said insulating sleeve at one end thereof and coaxial therewith, a normally grounded supporting flange axially disposed with respect to said shell, said flange being composed of electrically conducting material, a conducting ring between adjacent surfaces of said shell and said flange, conducting shield means radially surrounding said insulating shield and extending through said flange, said conducting shield means being electrically insulated from said conductor and said flange and electrically connected to said ring, said flange being free of electrical connection to solid insulation of said bushing except by way of said conducting ring, means for insulating said ring from said flange, and means including removable strap means for selectively electrically connecting said ring to said flange during normal operation of said bushing and for connecting said ring to a testing apparatus for measuring the quality of the bushing insulation.

3. A bushing for electrical apparatus comprising an elongated high voltage conductor, a sleeve of insulating material around said conductor except for the ends thereof, a ceramic shell around said insulating sleeve at one end thereof and coaxial therewith, a normally grounded supporting flange axially disposed with respect to said shell, said flange being composed of electrically conducting material, a conducting ring between adjacent surfaces of said shell and said flange, conducting shield means radially surrounding said insulating shield and extending from said ring toward the other end of said conductor and passing through said flange, said conducting shield means being electrically insulated from said conductor and said flange and being electrically connected to said ring, said flange being free of electrical connection to solid insulation of said bushing except by way of said conducting ring, means for insulating said ring from said flange, and means including removable strap means for selectively electrically connecting said ring to said flange during normal operation of said bushing and for connecting said ring to a testing apparatus for measuring the quality of the bushing insulation.

4. A bushing for electrical apparatus comprising an elongated high voltage conductor, a sleeve of insulating material around said conductor except for the ends thereof, a ceramic shell around said insulating sleeve at one end thereof and coaxial therewith, a normally grounded supporting flange axially disposed with respect to said shell, said flange being composed of electrically conducting material, a conducting ring between adjacent surfaces of said shell and said flange, conducting shield means radially surrounding said insulating shield and extending from said ring toward the other end of said conductor and passing through said flange, said conducting shield means being electrically insulated from said conductor and said flange and being electrically connected to said ring, said ring and conducting shield means providing mechanical support for said insulating shield and said conductor, said flange being free of electrical connection to solid insulation of said bushing except by way of said conducting ring, means for insulating said ring from said flange, and means including removable strap means for selectively electrically connecting said ring to said flange during normal operation of said bushing and for connecting said ring to a testing apparatus for measuring the quality of the bushing insulation.

5. A bushing for electrical apparatus comprising an elongated high voltage conductor extending through said bushing from terminal means at one end thereof, a sleeve of insulating material surrounding said conductor except for the ends thereof, a ceramic insulating shell surrounding said insulating sleeve and extending from said terminal means to central metallic ring means surrounding said sleeve, a metallic sleeve closely surrounding said sleeve and extending from said ring means toward the other end of said conductor and being electrically connected to said ring means, an annular metallic mounting flange surrounding said metallic sleeve adjacent said ring means, said mounting flange being insulated from said ring means and said metallic sleeve said flange being free of electrical connection to solid insulation of said bushing except by way of said ring means, and means including removable strap means for selectively connecting said ring means to said mounting flange during normal operation of said bushing and for disconnecting said ring means from said flange during a testing operation for measuring the quality of said bushing insulation.

6. A bushing for electrical apparatus comprising an elongated high voltage conductor extending through said bushing from terminal means at one end thereof, a sleeve of insulating material surrounding said conductor except for the ends thereof, a ceramic insulating shell surrounding said insulating sleeve and extending from said terminal means to central metallic ring means surrounding said sleeve, a metallic sleeve closely surrounding said insulating sleeve and extending from said ring means toward the other end of said conductor and being electrically connected to said ring means, an annular metallic mounting flange surrounding said metallic sleeve adjacent said ring means, said flange being free of electrical connection to solid insulation of said bushing except by way of said ring means, said ring means and metallic sleeve means providing mechanical support for said insulating sleeve and means including removable strap means for selectively connecting said ring means to said mounting flange during normal operation of said bushing and for disconnecting said ring means from said flange during a testing operation for measuring the quality of said bushing insulation.

References Cited in the file of this patent
UNITED STATES PATENTS

| | | |
|---|---|---|
| 2,402,466 | Terpak | June 18, 1946 |
| 2,679,026 | Frakes | May 18, 1954 |

FOREIGN PATENTS

| | | |
|---|---|---|
| 629,162 | Great Britain | Sept. 13, 1949 |